Oct. 1, 1963

J. A. JARDIN 3,105,289

COILED FILTERS

Filed March 25, 1960

Inventor:
Jacques Alphonse Jardin
by Robert Henderson
attorney

Oct. 1, 1963

J. A. JARDIN 3,105,289

COILED FILTERS

Filed March 25, 1960

Inventor:
Jacques Alphonse Jardin
by Robert Henderson
Attorney

Oct. 1, 1963   J. A. JARDIN   3,105,289
COILED FILTERS
Filed March 25, 1960   4 Sheets-Sheet 3
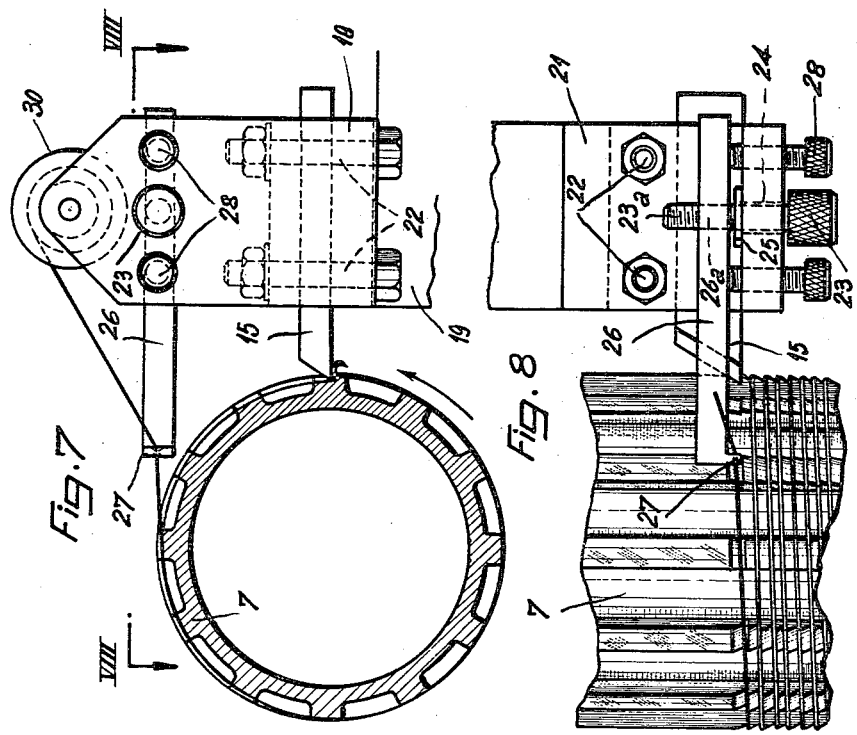
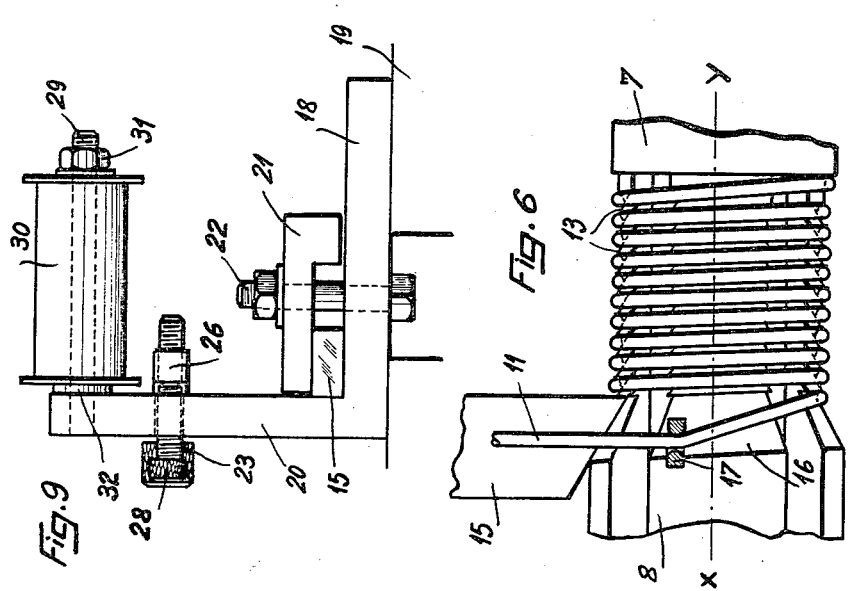
Inventor:
Jacques Alphonse Jardin
by Robert Henderson
Attorney Oct. 1, 1963 J. A. JARDIN 3,105,289
COILED FILTERS
Filed March 25, 1960 4 Sheets-Sheet 4
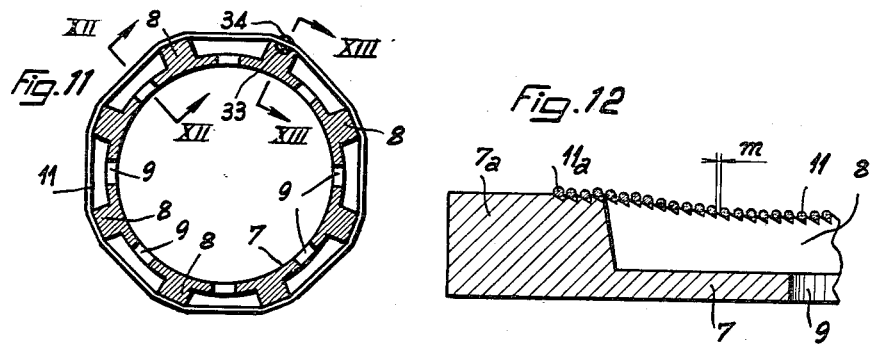
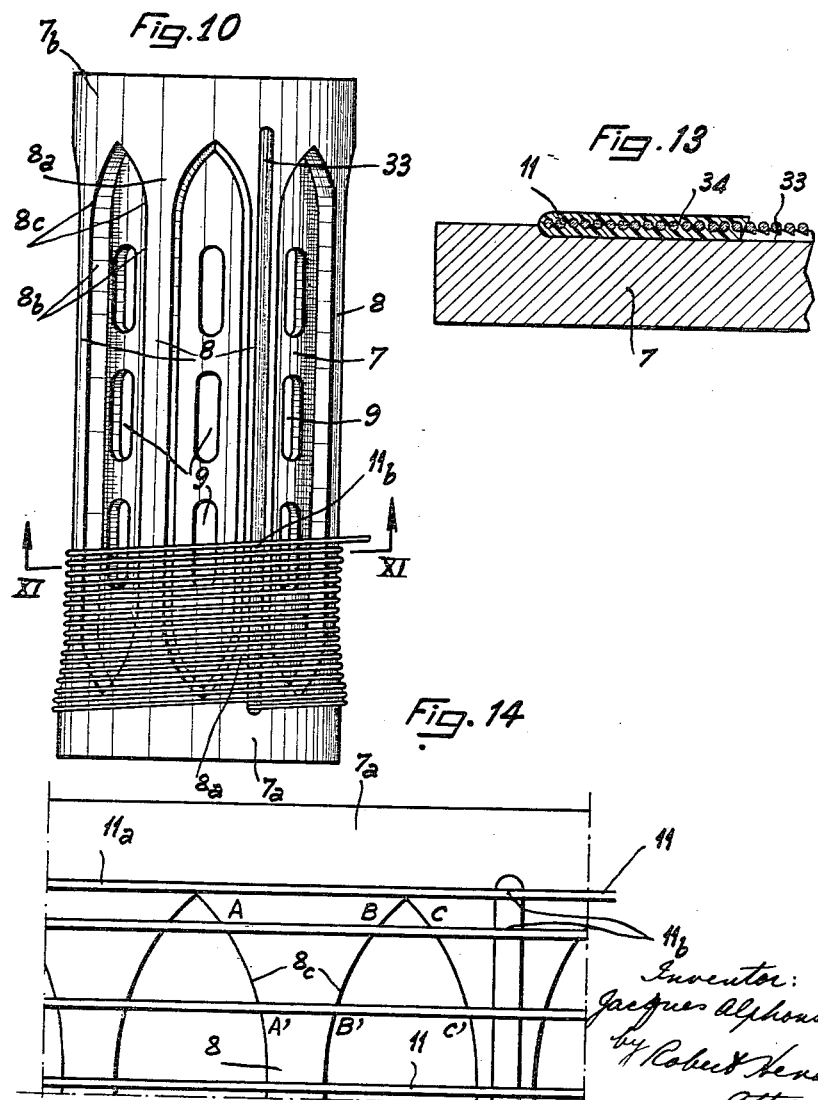

United States Patent Office 3,105,289
Patented Oct. 1, 1963

3,105,289
COILED FILTERS
Jacques Alphonse Jardin, Paris, France, assignor to Compagnie Electro-Mecanique, Paris, France, a company of France
Filed Mar. 25, 1960, Ser. No. 17,688
Claims priority, application France Dec. 1, 1959
4 Claims. (Cl. 29—163.5)

This invention is concerned with improvements in or relating to coiled filters.

Filters known as "coiled" filters are currently used in order to purify liquids such as industrial oils, the filtering surface of such filters consisting of a wire which is helically wound on a framework which is generally cylindrical in shape. The closer the turns of the helix are together, the finer is the filter and it is obviously advantageous to be able to use wires of as small a diameter as possible in order to increase the capacity of the filter surface.

In general, in order to manufacture filters of this type, a series of slots of the required pitch are first made, for example on a lathe, in longitudinal ribs comprised by the framework, then the wire is wound by placing the various turns in the slots in question.

When it is a question of a relatively coarse wire and if the mesh of the filter (that is to say the space between two consecutive turns) is fairly wide, this mode of manufacture does not present any serious disadvantages, but when it is desired to make filter surfaces with a very fine mesh using wires which are also very fine, it proves practically useless because it is impossible to arrange each turn with absolute certainty in the slot immediately following the one which received the previous turn and there is no means of guaranteeing that the filter surface will not comprise gaps which destroy the effectiveness of the filter.

We have found that it is possible to provide a faultless coiled filter surface, even with very fine wire and with turns extremely close together, by winding the wire on its supporting frame as the slots intended to hold the wire in position are machined therein.

The carrying out of this very simple process necessitates special precautions when it is a question of winding a fine wire in close turns. The process necessitates the formation of a helically extending cut or cuts (sometimes hereinafter referred to as slots) in the framework, which have transverse dimensions of the same order of magnitude as the diameter of the wire, and each slot has to be formed close beside the preceding one when the latter already contains the wire which it serves to hold. If the slots were given the conventional herring-bone or V section, it would be impossible to carry out the process because, in machining out each slot, the tool would act on and damage or sever the wire accommodated in the preceding slot. As these cuts or slots are grooves and function similarly to a single helical groove, they are sometimes hereinafter referred to collectively as a "helical groove."

In order to overcome this difficulty, according to the invention, the slots are given an asymmetrical section such that the side of the slot situated to the rear in relation to the direction of machining and winding has a relatively steep slope, while the other side, in contrast, forms a relatively small angle with the axis of the framework. It is possible to machine the slots very close to one another without the rear cutting edge of the tool being in danger of damaging the wire already placed in position.

The machining of the slots is effected by removing cuttings which are wider than the eventual slots so that while a forward turn or convolution is being cut away and until the next turn is cut away, the forward side of said forward convolution is in the form of a wide ramp inclined at said relatively small angle to the axis of the framework and the wire is guided onto this ramp and is guided and carried thereby towards the bottom of the slot. In these circumstances, no precise adjustment is necessary in order to place the wire in position and no error can occur.

It is advantageous to give the rear side of the slot a steeply inclined slope of the order of 90° in relation to the axis of the framework because in this case, on the one hand it is possible to bring the slots and hence the turns of the wire closest together and on the other hand there is no need to touch the rear face of the tip of the tool, which is radial, when the tool is sharpened. Thus, when the tool is re-mounted, no adjustment is necessary in the axial direction.

The process according to the present invention also offers the important advantage of enabling a filter, the filtering surface of which comprises successive portions of different mesh sizes to be manufactured in a very simple manner. For this purpose it is only necessary to modify, at the required position or positions, the pitch of the helix along which the slots are machined.

The invention also comprises apparatus adapted to carry out the process described above and consisting essentially of a combination of a lathe and a winding mechanism for the wire.

In carrying out the process according to the invention, in view of the fact that the turns of the wire are substantially polygonal in shape over the greater portion of the filter surface which bears against the ribs and at the same time the end portions of the framework are cylindrical, difficulties are encountered in starting and finishing the winding of the wire while ensuring a constant mesh.

The invention enables these difficulties to be overcome very simply.

For this purpose, according to a preferred feature of the invention, the portion of the framework provided with ribs is connected to cylindrical terminal members in a progressive manner, the neighbouring outer edges of adjacent ribs being joined for example at their ends in the form of ogives.

As a result of this formation of the framework, it is possible to start winding the wire on one of the cylindrical terminal members, the turns passing gradually from the circular shape to the substantially polygonal shape which they have over the greater portion of the filter surface, without the mesh of the filter undergoing any appreciable variation. Similarly, at the end of the winding, which finishes on the other cylindrical terminal member of the framework, the same progressive evolution of the shape of the turns takes place, in the reverse direction, with the same advantage.

Another preferred feature of the invention consists in a very simple means of fixing the filter surface to the framework. This means consists in sticking or soldering the various turns of said surface to said framework along a generatrix thereof. For this purpose, there is preferably formed along the crest of one of the ribs and over the adjacent cylindrical portions, a longitudinal groove over which pass the various turns and which is packed with a line of adhesive substance which coats the corresponding portions of the wire.

Not only does this enable the winding to be finished very simply but also, in the event of accidental breakage of the wire, only one turn is detached from the framework, whereas, if the wire were only fixed at its ends, the whole wire, the length of which is relatively great, would unwind, which might cause serious accidents.

The invention further comprises coiled filters having the features described in this specification.

In order that the invention may be more fully understood, certain preferred embodiments thereof will now be described, by way of example only, with reference to the accompanying drawings in which:

FIGURE 6 is a diagrammatic general view showing how the manufacture of a filter surface according to the invention is effected;

FIGURE 7 is a diagrammatic view in elevation of a device intended for carrying out the process of the invention;

FIGURE 8 is a plan view on VIII—VIII of FIGURE 7;

FIGURE 9 is a view of the rear of the device shown in FIGURES 7 and 8, the filter not being illustrated;

FIGURE 10 is a diagrammatic view, in elevation, of a filter cartridge in which the terminal portions are formed according to a preferred feature of the invention;

FIGURE 11 is a section on XI—XI of FIGURE 10;

FIGURE 12 is a partial section, on a large scale, on XII—XII of FIGURE 11;

FIGURE 13 is a section, likewise on a large scale, on XIII—XIII of FIGURE 11;

FIGURE 14 is a developed view, likewise on a large scale, of an end portion of the framework of FIGURE 10 on which only a few turns of wire are shown.

Figure 1:
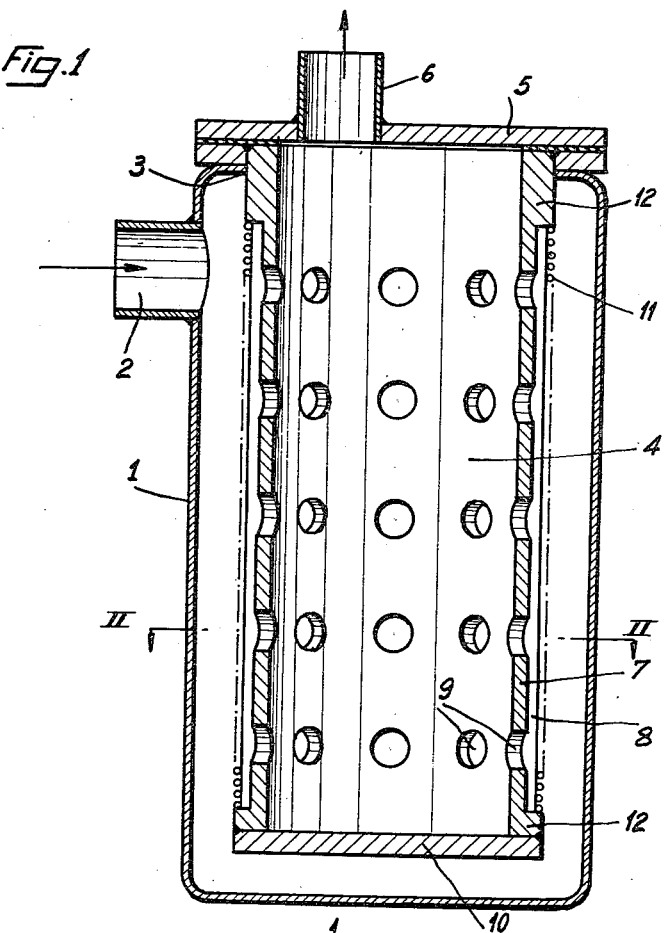
FIGURE 1 is a diagrammatic view in longitudinal section of a filter of the type to which the present invention relates.
Figure 2:
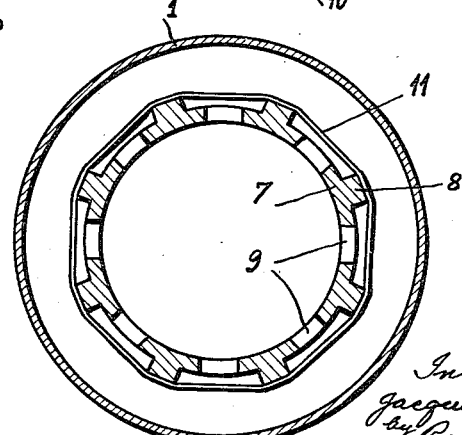
FIGURE 2 is a section on II—II of FIGURE 1.

FIGURES 1 and 2 show diagrammatically a coiled filter which comprises a casing 1 provided with a pipe 2 for the admission of the liquid to be filtered. At the top, the casing 1 has an aperture 3 in which there is mounted, in a sealed manner, a filter cartridge 4, the cover 5 of which comprises an outlet pipe 6.

The filter cartridge 4 consists of a cylindrical framework 7, the outer face of which is provided with a number of longitudinal ribs 8 between which are provided a series of holes 9; it is closed by a bottom plate 10.

The ribs 8 carry a filter surface 11 consisting of a wire which is wound in a continuous helix and the ends of which are fixed to cylindrical terminal members 12 of the framework.

As stated at the beginning of this specification, the filter surface is usually made by first helically cutting a whole series of equidistant slots in the outer face of each of the ribs 8, then winding the wire in such a manner that it is located in said slots. This two stage process can only be used in practice if the wire is sufficiently coarse and, consequently, the slots are sufficiently wide. As soon as it is necessary to use fine wire, that is to say wire having a diameter of less than about a tenth of a millimetre, this process becomes impracticable because, as stated above, it is impossible to accommodate the turns regularly in the slots and therefore to guarantee the quality of the mesh.

Figure 3:
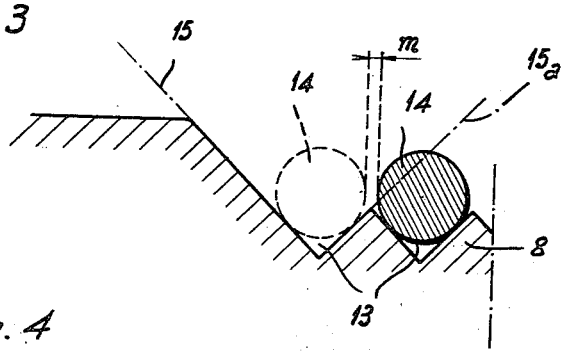
FIGURE 3 is a diagrammatic view on a large scale showing what would happen if an attempt were made to apply the process according to the invention to the winding of a fine wire in close turns if the slots were of the conventional herring-bone section.

FIGURE 3 shows the difficulties which would be experienced in trying to carry out the process according to the invention, that is winding the wire on the framework as the slots are machined, in the case of winding with fine wire in close turns if the slots were of the convention herring-bone or V-shape present in known filters of this type.

A slot 13 has been formed on a rib 8 and in it has been placed a turn 14 of wire. In the example illustrated, the wire is assumed to be very thin, for example having a diameter of 50 microns, and the mesh $m$ of the filter surface must be even smaller, for example of the order of a few microns.

In relation to this wire, the tool used, 15, is of enormous dimensions.

The figure clearly shows the impossibility of carrying out the process in the example selected because, in forming the slot following the first slot 13, the rear cutting edge 15a of the tool would cut into the last turn 14 of the wire. It would be possible to consider reducing the angle of the tip of the tool but, beyond a certain value of the mesh, this would lead to tools which were too tapered and consequently too fragile.

Figure 4:
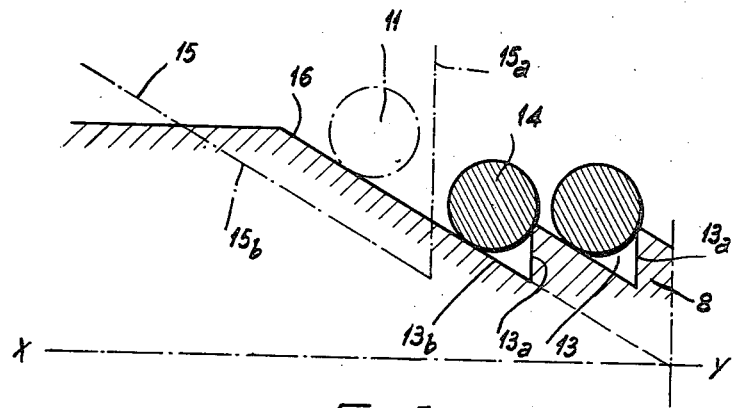
FIGURE 4 is a similar view to FIGURE 3 showing a preferred shape of slot according to the invention.

If, on the other hand, in accordance with the invention, the slots and the tip of the tool are given an asymmetrical outline as illustrated in FIGURE 4, there is no difficulty in carrying out the process.

In FIGURE 4, sectionally illustrating a forward convolution and a succeeding convolution of a helical groove cut by such a tool, the rear side 13a of each of the slots has a steep slope which, if projected, would be clear of wire in the next succeeding slot. Said slope is preferably 90° in relation to the longitudinal axis of the framework, illustrated by the horizontal dot-dash line. On the other hand, the forward side 13b is relatively gently inclined in relation to said axis, for example at a angle of about thirty degrees to form a relatively wide ramp.

As a result of the sharp slope given to the rear cutting edge 15a of the tool and to the rear side 13a of the slot, it is possible to machine the various slots extremely close to one another without the tool touching the last turn 14 placed in position.

On the other hand, by giving the forward side of the slot a relatively gentle slope, it is possible to give the tip of the tool a sufficiently great angle for said tool to have the required robustness and, moreover, the forward slope or ramp 16 formed by the front cutting edge 15b of the tool in the rib 8 is extended, i.e. relatively wide. Thus, in order to place the wire 11 in the corresponding slot in a forward convolution of the helical cut, there is a wide ramp available in front of said slot on which ramp the wire is placed and which guides it reliably towards the actual slot, so that the placing of the wire is greatly facilitated without any error being possible.

Moreover, by directing the rear side of the slot and the corresponding cutting edge of the tool perpendicular to the axis of the framework, there is not only the advantage of being able to reduce the mesh of the filter surface to dimensions as small as desired but also that of greatly simplifying the sharpening and adjustment of the tool because it is only necessary to sharpen the front edge 15b thereof and the replacing of the tool in position does not necessitate any adjustment in the axial direction.

The present process also permits filters having successive portions with different mesh sizes to be very simply manufactured. In order to manufacture such filters all that is required is that after having machined a first portion, on which are wound turns having a separation $m_1$ corresponding to slots of pitch $p_1$, to modify the pitch of the slots to bring them to the new value $p_2$ which automatically gives the mesh the new value $m_2$ $$(p_2-p_1=m_2-m_1)$$

Figure 5:
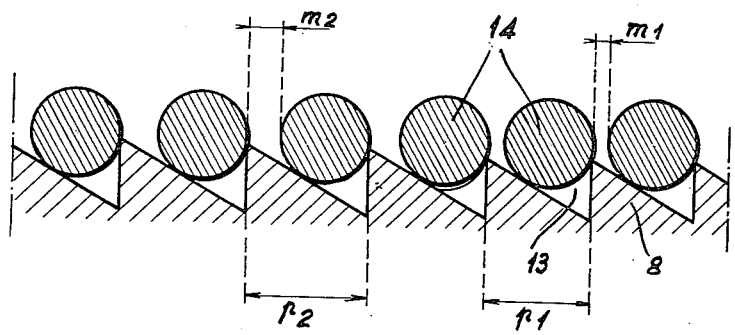
FIGURE 5 is a diagrammatic view, likewise on an enlarged scale, of a portion of a filter comprising successive portions with different sizes of mesh.

Thus a filter is obtained in which, although the mesh widths are different, both the framework and the filter surface are continuous (FIGURE 5).

In a vertical filter, for example, it is possible to give the lowest portion the finest mesh and the highest portion a larger mesh, thus permitting, in certain cases, the capacity of the filter to be increased without harm to the quality of the filtration.

The process which has just been described can be carried out very easily by a combination of an apparatus for machining the slots and a winding device.

FIGURE 6 shows diagrammatically how this is done.

The framework 7 is mounted, for example on a lathe which is not illustrated, in such a manner as to turn about its axis X—Y and associated with the tool 15, which cuts the slot 13 in the ribs 8, in a wire guide 17 which is connected to said tool for displacement therewith and through which passes the suitably tensioned wire 11.

As is clearly seen in the drawing, it is not necessary for the wire guide to be centered exactly on the bottom of the slot; it is sufficient for it to be situated above the ramp 16 which is illustrated in FIGURE 4. Under the influence of the traction which is exerted on it, the wire slides automatically along said ramp to the bottom of the slot and the winding is faultless.

In FIGURES 7, 8 and 9, which show, in detail, apparatus adapted for carrying out the process, the tool 15 is mounted in the conventional manner in a tool-holder 18 fixed, for example, to the carriage or turret 19 of the lathe. It is held in abutment against the rear cheek 20 of the tool-holder by means of a jaw 21 and bolts 22.

On said cheek, above the tool, there is provided a micrometer screw 23 which can turn freely in a hole 24 in the cheek by means of an unthreaded portion of its shank and which is prevented from longitudinal displacement by means of a collar 25. (FIGURE 8). The threaded end 23a of said screw is engaged in a tapped hole 26a in a wire guide 26 which ends in an eyelet 27 through which the wire passes. Locking screws 28 enable the wire guide 26 to be immobilised on the screw 23.

Above the wire guide, the cheek 20 carries a spindle 29 on which can be mounted a spool of wire 30 which is held in position by a nut 31 and is associated with a brake 32.

The slots intended to receive the wire are not illustrated in FIGURES 10, 11 and 14 so as not to detract from the clarity of the drawing.

FIGURE 10 shows the framework 7 which is partially fitted with wire 11 and which comprises longitudinal ribs 8 between which are provided series of holes 9.

The ribs 8 are connected to the cylindrical end portions 7a and 7b of the framework by means of progressively widening portions 8a in such a manner that their outer edges 8b converge towards one another. The converging portions may be given any shape. In the present example, the ends 8c of each set of two adjacent edges 8b form an ogive.

Furthermore, along the crest of one of the ribs 8, which may be made a little wider than the others, there is formed a groove 33 which projects at each end over the adjacent cylindrical portions 7a and 7b.

As shown in FIGURE 11, the wire 11 has a substantially polygonal configuration in the central portion of the filter surface where it rests on the ribs 8, while the wire has a circular configuration where it rests on the cylindrical terminal members 7a, 7b.

The framework which has just been described overcomes the problems which arise as a result of this difference in shape in the turns in the production of the filter surface.

In winding this framework, the winding of the wire 11 is commenced on the cylindrical terminal member 7a, the first turns, such as that designated by 11a in FIGURE 14 having a substantially circular shape.

As the turns progress over the ogival portions 8c, they gradually change shape, their circular portions such as AB, A', B' diminishing in length, while their rectilinear portions BC, B', C' become longer.

Thus the passage from the substantially circular shape of the turns wound on the cylindrical member 7a to the substantially polygonal shape of the turns resting on the ribs 8 is progressive and, as shown in FIGURE 12, the value of the mesh $m$ remains constant. The same is also true, of course, for the final stage of winding where the turns pass equally progressively from the polygonal shape to the circular shape on the member 7b.

Thus, in carrying out the process the machining of the slots and the simultaneous winding of the wire is commenced on the cylindrical portion 7a and is stopped on the cylindrical portion 7b. The filter surface covers, with a constant mesh, the whole of the apertures bounded by the ribs.

In addition, the present invention offers an extremely convenient means of locating the wire and fixing the filter surface to the framework.

As shown in particular in FIGURE 10, a small portion 11b of each turn passes over the longitudinal groove 33 which is formed in the framework. When the winding is completed, the ends of the wire are temporarily held fast and a quantity of an adhesive 34 (FIGURE 13) sufficient to coat the portions 11b is poured into the groove 33. When the adhesive has hardened sufficiently, the ends of the wire 11 are cut.

This adhesive may be a synthetic plastic material, for example a resin sold commercially under the name: "Araldite D."

According to a modification, it would also be possible to pack the groove 33, before the winding, with a substance such as tin solder and, when the wire has been wound, to heat this strip of solder, for example by means of a soldering iron, in order to melt the solder and to cause it to penetrate into the interstices between the turns of the wire.

Whatever the means used, the filter surface is stuck or soldered to the framework over a narrow strip along one generatrix.

What I claim is:

1. A method of manufacturing a coiled filter comprising making, in the exterior of a generally cylindrical frame, a helical wire-holding cut of a pitch only slightly greater than the thickness of wire to be wound on said frame and having a single forward helical convolution substantially wider than said pitch and succeeding helical convolutions of the same width as said pitch, and guiding relatively fine wire into said forward convolution; all said convolutions having rear surfaces of such steep inclination that projections of said surfaces are clear of wire in a next succeeding convolution, said single forward convolution being cut to provide it with a less steeply inclined forward surface constituting a relatively wide ramp for receiving the wire being guided into said forward convolution and for carrying said wire into engagement with the rear surface of said forward convolution, the cutting of said forward convolution overlapping and cutting away a helically terminal part of the width of the ramp as said forward convolution progressively becomes one of said succeeding convolutions, and said cutting away being of such extent as to form the succeeding convolutions of the same width as the pitch of the helical cut.

2. A method according to claim 1, wherein said frame comprises a plurality of spaced, circularly arranged parallel ribs and coaxial, cylindrical terminal members rigidly integral with the opposite ends of said ribs, said method further including the making of said wire-holding cut to extend about the radially outer surfaces of said ribs and into the outer surfaces of said terminal members and disposing the wire in said cut and about said ribs and terminal members.

3. A method according to claim 2, wherein the wire is of such fineness that, when thus wound about said ribs, it assumes a polygonal form, the method further including formation of the ends of said ribs to gradually widened form in which they adjoin each other at their junctures with said terminal members, whereby to graduate the change in the winding between cylindrical form at said terminal members and polygonal form at intermediate portions of said ribs.

4. A method according to claim 3, further including the forming, prior to the making of said helical cut, of an axially extending groove in the outer surface of one of said ribs and extending into said terminal members and intersecting said helical cut at plural convolutions of the latter at said one rib and at said terminal members, and disposing adhesive material in said groove in adherent engagement with the wire in said cut to anchor the wire in the latter.

References Cited in the file of this patent

UNITED STATES PATENTS

| | | |
|---|---|---|
| Re. 18,968 | Willers | Oct. 10, 1933 |
| 813,434 | Jones | Feb. 27, 1906 |
| 1,639,019 | Auty | Aug. 16, 1927 |
| 2,084,433 | Chorlton | June 22, 1937 |
| 2,323,713 | Harmon | July 6, 1943 |
| 2,346,647 | Bennison | Apr. 18, 1944 |
| 2,682,309 | Banchback | June 29, 1954 |

FOREIGN PATENTS

| | | |
|---|---|---|
| 458,649 | Great Britain | Dec. 23, 1936 |